(12) United States Patent
Busscher et al.

(10) Patent No.: US 10,434,946 B2
(45) Date of Patent: Oct. 8, 2019

(54) SPRING SECURED MOUNTING SYSTEM

(71) Applicant: Gentex Corporation, Zeeland, MI (US)

(72) Inventors: Bradley L. Busscher, Grand Rapids, MI (US); Ulrich A. Kuester, Spring Lake, MI (US); Jason D. Hallack, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 924 days.

(21) Appl. No.: 14/620,995

(22) Filed: Feb. 12, 2015

(65) Prior Publication Data

US 2015/0224928 A1 Aug. 13, 2015

Related U.S. Application Data

(60) Provisional application No. 61/939,056, filed on Feb. 12, 2014.

(51) Int. Cl.
| | |
|---|---|
| *B60R 1/04* | (2006.01) |
| *B60R 1/12* | (2006.01) |
| *B60R 11/04* | (2006.01) |
| *F16B 2/22* | (2006.01) |
| *F16B 21/07* | (2006.01) |

(52) U.S. Cl.
CPC ............ *B60R 1/04* (2013.01); *F16B 2/22* (2013.01); *F16B 21/073* (2013.01)

(58) Field of Classification Search
CPC ..... B60R 1/04; B60R 1/12; B60R 2001/1223; B60R 11/04; B60R 2011/0026; F16B 2/22; G02B 7/182

USPC .......................................................... 224/482
See application file for complete search history.

(56) References Cited

U.S. PATENT DOCUMENTS

| | | | |
|---|---|---|---|
| 5,100,095 A | 3/1992 | Haan et al. | |
| 5,377,948 A * | 1/1995 | Suman | B60R 1/04 248/549 |
| 5,820,097 A * | 10/1998 | Spooner | B60R 1/04 248/549 |
| 5,931,440 A * | 8/1999 | Miller | B60R 1/04 248/549 |
| 6,079,486 A * | 6/2000 | Cennamo | H01L 23/4093 165/185 |
| 6,447,127 B1 | 9/2002 | Yoshida et al. | |
| 6,483,438 B2 | 11/2002 | DeLine et al. | |

(Continued)

FOREIGN PATENT DOCUMENTS

| | | | | |
|---|---|---|---|---|
| DE | 4320488 C1 * | 7/1994 | | B60R 1/04 |
| EP | 2743135 A1 * | 6/2014 | | B60R 1/04 |

*Primary Examiner* — Nathan J Newhouse
*Assistant Examiner* — Lester L Vanterpool
(74) *Attorney, Agent, or Firm* — Price Heneveld LLP; Bradley D. Johnson

(57) ABSTRACT

A spring clip for a vehicle for mounting a rearview device is disclosed. The spring clip comprises a base portion comprising a coupling surface, configured to interconnect the rearview device with the windshield, and a plurality of spring biased legs. Each of the spring biased legs forms an engagement profile having a continuous rounded profile and an internal engagement surface. The internal engagement surface forms a triangular assembly profile. The engagement profile is configured to slidably engage an interface profile of a bracket configured to interconnect the rearview device to the windshield.

18 Claims, 4 Drawing Sheets

(56) References Cited

U.S. PATENT DOCUMENTS

| | | | |
|---|---|---|---|
| 7,717,394 B2* | 5/2010 | Tanaka | B60R 1/04 248/549 |
| 7,726,623 B2 | 6/2010 | Muller | |
| 8,134,117 B2 | 3/2012 | Heslin et al. | |
| 8,925,891 B2* | 1/2015 | Van Huis | B60R 11/04 248/475.1 |
| 9,174,577 B2* | 11/2015 | Busscher | B60R 1/04 |
| 9,244,249 B2* | 1/2016 | Kim | B60R 1/04 |
| 9,573,525 B2* | 2/2017 | Minikey, Jr. | B60R 1/04 |
| 2008/0315060 A1 | 12/2008 | Muller | |
| 2011/0168866 A9 | 7/2011 | Gruener et al. | |
| 2013/0062497 A1* | 3/2013 | Van Huis | B60R 11/04 248/479 |
| 2014/0055617 A1* | 2/2014 | Minikey, Jr. | B60R 1/04 348/148 |

\* cited by examiner

SPRING SECURED MOUNTING SYSTEM

BACKGROUND

The disclosure generally relates to a vehicle rearview device assembly. More particularly, the present disclosure relates to a mounting system for mounting an interior rearview device in the interior of a vehicle.

SUMMARY

One aspect of the present disclosure includes a rearview device mounting assembly configured for use with a vehicle. The mounting assembly comprises a spring clip having a plurality of spring biased legs. Each of the spring biased legs forms an engagement profile configured to couple to a subassembly comprising a rearview device and a plurality of spring biased legs. The assembly further comprises a bracket having an engagement surface and a plurality of lobes. The engagement surface is configured to couple to a windshield or indirectly through one or more intermediate components coupled to the windshield. The plurality of lobes extend outward from the engagement wall and correspond to each of the spring biased legs. The plurality of lobes form an interface profile configured to complement the engagement profile. The spring clip is configured to engage the bracket in a first assembly profile and rotationally engage the bracket in a second assembly profile to operably couple the spring clip to the bracket.

Another aspect of the present disclosure includes a spring clip for a vehicle for mounting a rearview device. The spring clip comprises a base portion comprising a mounting surface configured to interconnect the rearview device with the windshield and a plurality of spring biased legs. Each of the spring biased legs form an engagement profile having a continuous rounded profile and an internal engagement surface. The internal engagement surface forms a triangular assembly profile. The engagement profile is configured to slidably engage an interface profile of a bracket configured to interconnect the rearview device to a windshield.

Yet another aspect of the present disclosure includes a spring clip for a rearview device mounting assembly. The spring clip comprises a base portion forming at least one mounting opening, a plurality of spring biased legs, and an engagement surface. The engagement surface is configured to couple to a subassembly comprising a rearview device. Each of the spring biased legs forms an internal engagement surface. The spring clip is configured to receive a bracket in a first assembly profile and rotationally engage the bracket in a second assembly profile to operably couple the spring clip to the bracket.

The advantageous design introduced herein provides for an assembly configured to limit a plastic deformation of the spring clip. By limiting the plastic deformation, the assembly arrangement disclosed herein limits manufacturing costs by allowing for higher variance in various components of the assembly. This is accomplished, in part, by decreasing the spring constant of the spring clip legs. As is demonstrated in the detailed implementations that follow, the disclosure provides for a novel and beneficial assembly for supporting a rearview mirror.

DETAILED DESCRIPTION

Figure 1:
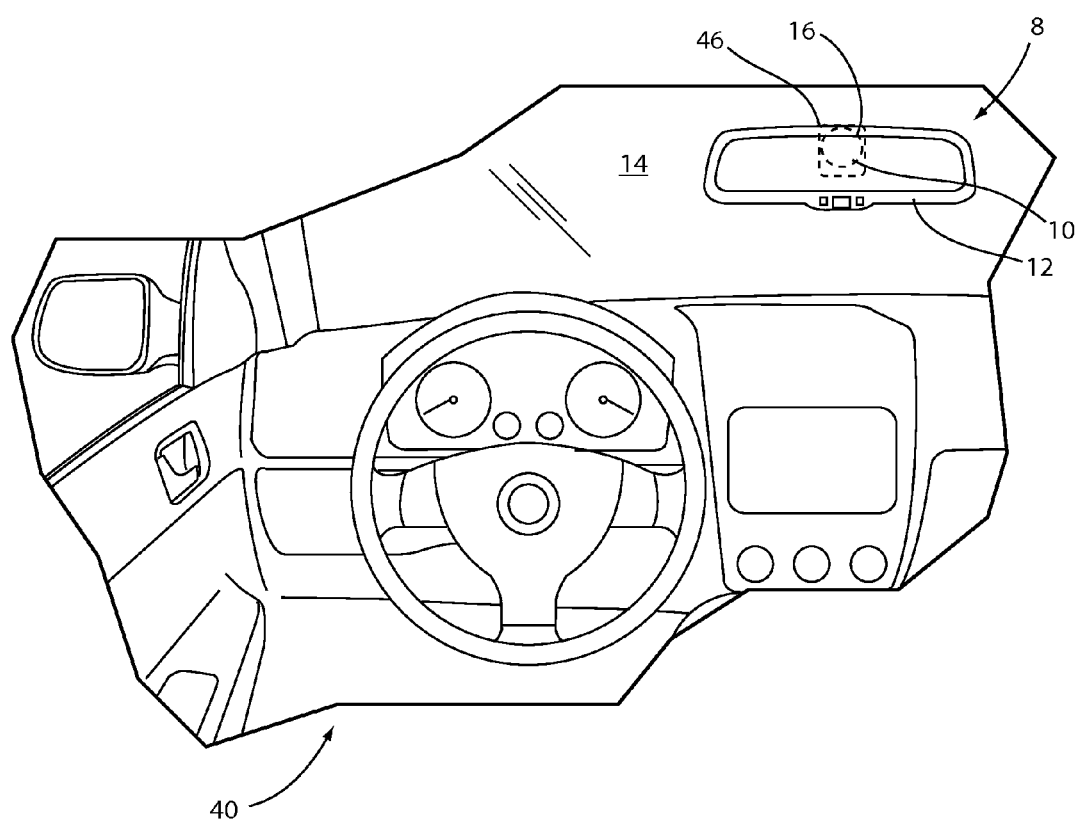
FIG. 1 is a front elevational view of a rearview device connected with a windshield of a vehicle.

For purposes of description herein, the terms "upper," "lower," "right," "left," "rear," "front," "vertical," "horizontal," "clockwise," "counter-clockwise," "interior," "exterior" and derivatives thereof shall relate to the arrangement of the elements introduced in reference to FIG. 1 as viewed by an occupant of the vehicle shown. However, it is to be understood that the various elements of the assemblies illustrated may assume various alternative orientations, except where expressly specified to the contrary. It is also to be understood that the specific devices and processes illustrated in the attached drawings, and described in the following specification are simply exemplary embodiments of the concepts defined in the appended claims. Hence, specific dimensions and other physical characteristics relating to the embodiments disclosed herein are not to be considered as limiting, unless the claims expressly state otherwise.

Figure 2A:
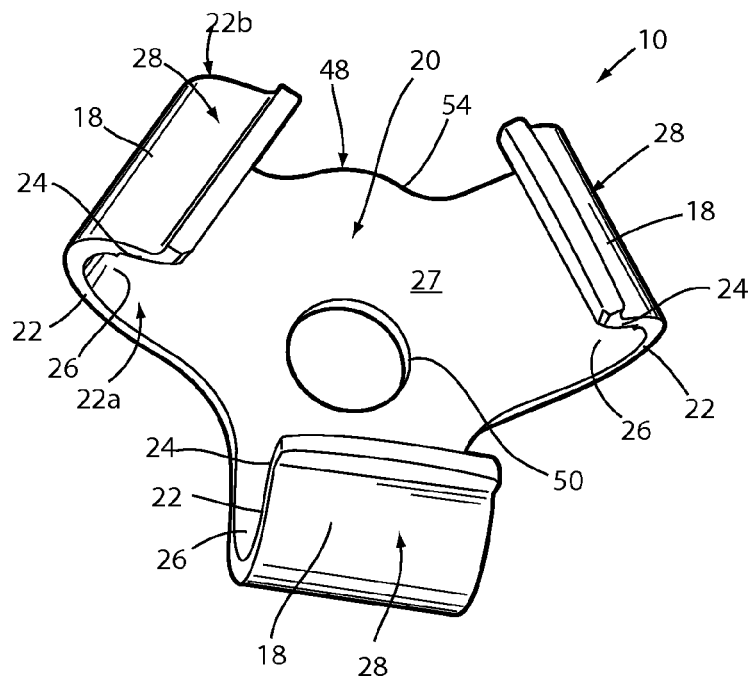
FIG. 2A is a perspective view of one embodiment of a spring clip of the present disclosure.
Figure 2B:
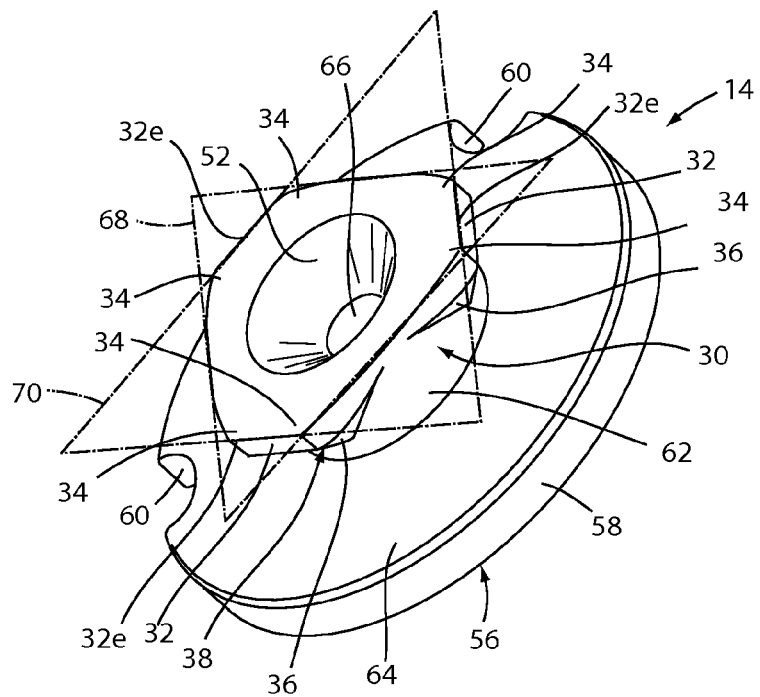
FIG. 2B is a perspective view of one embodiment of a bracket of the present disclosure.

Referring to the embodiment illustrated in FIGS. 1-2B, a rearview device mounting assembly 8 is illustrated in an exemplary implementation. The mounting assembly 8 includes a first subassembly and a second subassembly. The first subassembly is configured to engage and operably couple to the secondary subassembly. The first subassembly includes a spring clip 10 configured to secure a rearview device 12 to a bracket 16 disposed on a windshield 14. The spring clip 10 includes a plurality of spring biased legs 18 extending from a base portion 20. Each of the legs 18 includes an engagement profile 22 having a beveled engagement edge 24 and an internal engagement surface 26. The engagement profile 22 forms a continuous rounded profile having a first continuous curved portion 22a extending outward in a direction normal to a surface 27 of the base portion 20 and a second curved portion 22b that extends back toward the center of the base portion 20 proximate a distal end of the each of the legs 18.

The first and second continuous curved portions 22a, 22b form a continuous curved portion corresponding to the continuous rounded profile. The continuous curved portion includes an enlarged continuous radius configured to prevent yield in each leg 18 of the spring clip 10 by enabling the first and second curved portions to deflect uniformly along the continuous curved portion. In this way, a spring force of each leg 18 may be maintained during an assembly operation of the spring clip 10 to the bracket 16 by limiting a plastic deformation of each of the legs 18. Another benefit of this design is that the spring force of each of the legs 18 may be reduced while improving a resulting clamping force of the spring clip 10 to the bracket 16. Yet another benefit of the design includes an increased tolerance in the manufacture of the spring clip 10 while maintaining the clamping force. For example, in an ideal configuration, a distal end of each of the plurality of legs 18 is approximately equidistant from the central axis extending from the center of the base portion 20. However, the tolerance of the engagement profile 22 may vary such that a distal end portion of each of the legs 18 may vary in distance in relation to the center of the base portion 20. The interaction of the spring clip 10 and the bracket 16 provides for tolerance of an increased variation in manufacture of the spring clip 10 and the bracket 16 while maintaining the clamping force.

In the current example and corresponding examples disclosed herein, the interaction of the engagement profile 22 of the spring clip 10 and a corresponding interface profile of the bracket 16 are configured to limit the deflection of each of the legs 18 and improve a uniformity of the deflection to reduce the yield in each of the legs 18 during an assembly operation. Some of the benefits provided by this disclosure include reduced cost and reduced spring stiffness of the spring clip 10 prior to an assembly operation resulting in an improved clamping force of the spring clip 10 to the bracket 16 after the assembly operation. The disclosure may further provide for improved life of the spring clip 10 through assembly and disassembly operations by reducing yield to maintain the improved clamping force.

Though the spring clip 10 and the bracket 16 are described as being respectively coupled to a first subassembly and a second subassembly, the arrangement of the spring clips and brackets discussed herein may be modified without departing from the spirit of the disclosure. For example, a bracket may be coupled to a first subassembly incorporating a rearview device and a spring clip may be coupled to a second subassembly coupled to the windshield 14. The various implementations of the elements described herein may provide for a spring clip that undergoes minimal plastic deformation in assembly operation to provide enhanced pressure from a plurality of spring biased legs once assembled. The various implementations discussed herein provide for a novel assembly interface that provides for a decrease in cost by allowing increased manufacturing variation in the spring clip and the bracket without decreasing the effectiveness of the interface.

With reference to FIGS. 2A-2B, the internal engagement surface 26 of each of the legs 18 forms a spring biased portion 28 configured to engage and operably couple to an engagement edge 32e—top edge of wall 32 of the bracket 16. In the illustrated embodiments, the engagement wall 30 of the bracket 16 forms a tri-lobe button including a plurality of lobes 32 extending outward from the engagement wall 30. Each of the lobes 32 is formed having a plurality of rounded corners 34 and rounded ribs 36. The rounded corners 34 of each of the lobes 32 form an interface profile 38 configured to rotatably engage the internal engagement surface 26 of each of the legs 18 of the spring clip 10. When rotated in a mating formation, each of the legs 18 engages each of the rounded ribs 36 of the lobes 32 causing each of the spring biased portions 28 to apply pressure to each of the lobes 32 at edge 32e. The spring clip 10 may lock into a mounted position as the internal engagement surface 26 of each legs 18 aligns with each lobe 32 at edge 32e.

The corresponding surfaces and rotating interaction of the bracket 16 and the spring clip 10 provide for an efficient locking assembly that minimizes the deflection of the spring clip 10 while being assembled to the bracket 16. This advantageous design provides for minimal plastic deformation allowing a clamping force of the spring clip 10 applied to the bracket 16 to be maximized for a given deflection of each of the legs 18 of the spring clip 10 in the mounted position. Limiting the plastic deformation of the spring clip 10 further allows for lower cost in manufacturing and higher variance in the spring clip 10 while maintaining a requisite spring force for coupling the spring clip to the bracket for various implementations.

Referring to the embodiment illustrated in FIG. 1, the reference numeral 8 generally designates a rearview device mounting assembly for use in a vehicle 40. The rearview device mounting assembly 8 is configured to attach to the windshield 14 and includes the first subassembly and the second subassembly. The first subassembly includes the rearview device 12 shown mounted to the windshield 14 and further includes a rearview device mount 46, sometimes also known as a "channel mount" or "die cast piece." The spring clip 10 is operably coupled to the mount 46 and one or more intermediate components including a mounting plate may be disposed between the mount 46 and the spring clip 10. The rearview device mounting assembly 8 of the present disclosure may be used with a variety of mounts which are configured for engagement with a variety of rearview devices 22 including prism-type mirrors, electrochromic mirrors, and camera displays.

During an assembly operation, the bracket 16 may initially be secured to the windshield 14 directly or through one or more intermediate components of the second subassembly. Illustrated here in an assembled form, the first subassembly including spring clip 10 is operably coupled to the bracket 16. The spring clip 10 is further operably coupled to the mount 46 and is received over the bracket 16. With the second subassembly secured to the windshield 14 and the first subassembly secured to the second subassembly, the rearview device mounting assembly 8 adjustably supports the rearview device 12 in cantilevered fashion such that the device 12 projects into a passenger compartment of the vehicle 40 for use by the operator of the vehicle. The configuration of the rearview device mounting assembly 8 is arranged such that an assembly operation may be undertaken to consistently and securely attach the spring clip 10 to the bracket 16 while minimizing the plastic deformation of the spring clip 10.

Referring still to the embodiment of FIGS. 2A and 2B, the spring clip 10 is configured to secure the rearview device 12 to the bracket 16. The base portion 20 of the spring clip 10 further includes a coupling surface 48 configured to abut the mount 46 as discussed in FIG. 4 or an intermediate mounting plate. The spring clip 10 may be secured to the mount 46 with a fastener by engaging the spring clip 10 through a mounting opening 50 located centrally in the base portion 20. A center of the mounting opening 50 may define a central axis extending approximately from the center of the base portion 27. In some implementations, the mounting opening may be implemented as a plurality of openings configured to receive a plurality of fasteners. An exterior contour 54 of the spring clip 10 may further be configured to engage a pocket of the mount 46 to secure the spring clip.

The bracket 16 further includes an engagement surface 56 and a first exterior profile 58. The engagement surface 56 may be configured to attach to one or more intermediate components of the second subassembly to secure the bracket 16 to the windshield 14. The first exterior profile 58 is configured in a rounded shape that includes a plurality of notches 60, in this example two notches. Each of the notches 60 may further be configured to align with a corresponding portion of the one or more intermediate components to align or secure the bracket 16 to the one or more intermediate components.

A second exterior profile 62 extends around the bracket 16 between a front surface 64 and the engagement wall 30. The second exterior profile 62 is also configured in a rounded shape and is aligned coaxially with the first exterior profile 58. A cylindrical opening 66 is further disposed coaxially with the first exterior profile 58 and extends from the engagement surface 56 to an optional cone-shaped opening 52. The engagement wall 30 has a profile having a first triangular assembly profile 68 and a second triangular assembly profile 70. The first triangular assembly profile 68 is configured to align with the internal engagement surfaces 26 of each of the plurality of legs 18, in this example the three legs having a corresponding triangular shape. The second triangular assembly profile 70 is configured to rotatably engage the legs 18 by applying pressure from each of the lobes 32 in response to a rotational force applied to the spring clip 10. Upon rotation into the mounted position, each of the legs 18 may align with each of the lobes 32 to secure the first subassembly including the spring clip 10 to the second subassembly including the bracket 16.

Figure 3A:
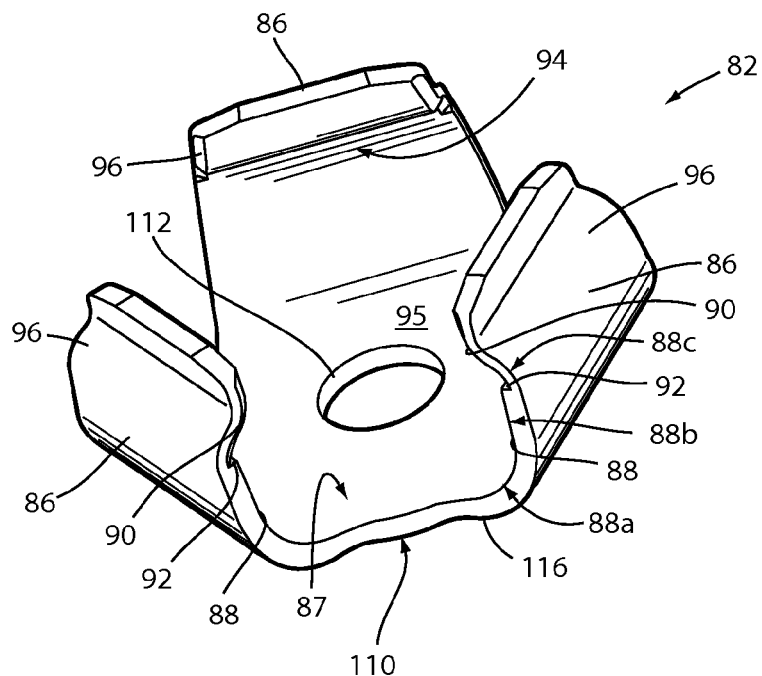
FIG. 3A is a perspective view of one embodiment of a spring clip of the present disclosure.
Figure 3B:
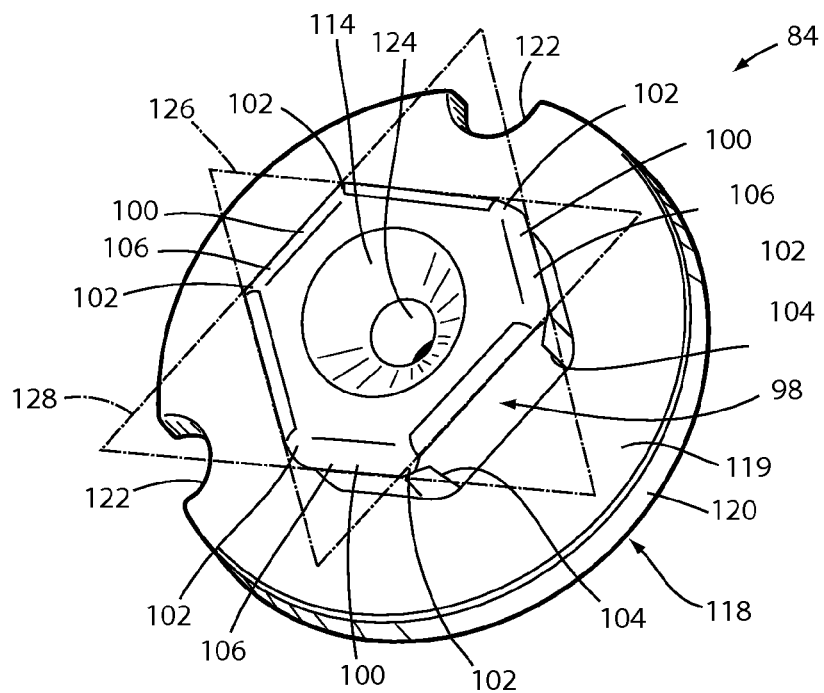
FIG. 3B is a perspective view of one embodiment of a bracket of the present disclosure.

Referring to the embodiment of FIGS. 3A and 3B, detailed perspective views of a spring clip 82 and a bracket 84 are shown. The spring clip 82 and the bracket 84 may demonstrate additional features and elements that may be implemented alone or in combination with the elements described in reference to the spring clip 10 and the bracket 16 of the mounting assembly 8. The spring clip 82 includes a plurality of spring biased legs 86, in this example three legs, extending from a base portion 87. Each of the legs 86 includes an engagement profile 88 having a beveled engagement edge 90. Each of the legs 86 further forms an internal engagement surface 94. The engagement profile 88 includes a first curved portion 88a extending outward along a first radius in a direction normal to a surface 95 of the base portion 87. A straight portion 88b may extend from a distal end portion of the first curved portion 88a along the direct normal to the surface 95. A second curved portion 88c may further extend along a second radius from a distal end portion of the straight portion 88b and extend back toward the center of the base portion 87 proximate to a distal end of the each of the legs 86.

Additionally, as shown in FIG. 3A, a tapered portion is formed by each of the legs 86 extending from the first curved portion 88a to the second curved portion 88c. In this configuration, the spring force of each of the legs is significantly maintained along the tapered portion. In this way, the spring clip 82 further provides for decreased rotational force required during assembly compared to conventional spring clips. The tapered portion further provides for decreased yield in the spring clip 82 to improve the life of the assembly described herein.

The internal engagement surface 94 forms a spring biased portion 96 configured to engage and operably couple to an engagement wall 98 of the bracket 84. The engagement wall 98 of the bracket 84 may form a tri-lobe button including a plurality of lobes 100 extending outward from the engagement wall 98. Each of the lobes 100 is formed having a plurality of rounded corners 102 and fileted ribs 104. The fileted ribs 104 extend outward from the engagement wall and form a narrow portion 106 proximate to a distal end portion of each of the lobes 100. The narrow portion 106 and the rounded corners 102 of each of the lobes 100 form an interface profile configured to rotatably engage the beveled engagement edge 90 of each of the internal engagement surfaces 94.

An interaction of each of the lobes 100 of the bracket 84 may cause each of the spring biased portions 96 to lift in the direction normal to the surface 95 and radially from the centerline axis due to the a force being applied by the fileted ribs 104 during the rotational engagement of each of the lobes 100. In this way, a spring force of each leg 86 may be maintained during an assembly operation of the spring clip 82 to the bracket 84 by limiting a plastic deformation of each of the legs 86. Another benefit of this design is that the spring force of each of the legs 86 may be reduced while improving a resulting clamping force of the spring clip 82 to the bracket 84. Yet another benefit of the disclosure includes an increased tolerance in the manufacture of the spring clip 82 while maintaining the clamping force. For example, the tolerance of the engagement profile 88 including the first and second curved portions 88a, 88c and the straight portion 88b may vary such that a distal end portion of each of the legs 86 may be may vary in distance in relation to the center of the base portion 87. The interaction of the spring clip 82 and the bracket 84 provides for tolerance of an increased variation in manufacture of the spring clip while maintaining the clamping force.

In this example and corresponding examples disclosed herein, the interaction of the engagement profile 88 of the spring clip 82 and the interface profile of the bracket 84 are configured to limit the deflection of each of the legs 86 and improve a uniformity of the deflection to reduce the yield in each of the legs 86 during an assembly operation. Some of the benefits provided by this disclosure include reduced cost and reduced spring stiffness of the spring clip 82 prior to an assembly operation resulting in an improved clamping force of the spring clip 82 to the bracket 84 after the assembly operation. The improved clamping force may be a result of limited plastic deformation between a spring clip (e.g. 12, 82) and a bracket (e.g. 16, 84) during an assembly operation. Reducing plastic deformation via the various aspects of the spring clip and the bracket provides for improved life of the spring clip through assembly and disassembly operations by reducing yield to maintain the improved clamping force.

The spring clip 82 is configured to secure a rearview device, for example the rearview device 12, by rotationally engaging the bracket 84. Similar to the implementation introduced in reference to FIGS. 2A and 2B, the spring clip 82 and the bracket 84 may be implemented as respective components in a first subassembly and a second subassembly of a mounting assembly (e.g. mounting assembly 8). The base portion 87 of the spring clip 82 further includes a coupling surface 110 configured to abut a mount, for example the mount 46, or an intermediate mounting plate. The spring clip 82 may be secured to the mount 46 by a fastener by engaging the spring clip 82 through a mounting opening 112 located centrally in the base portion 87. In some implementations, a mounting opening may be implemented as a plurality of openings in the base portion 87 configured to receive a plurality of fasteners. An exterior contour 116 of the spring clip 10 may further be configured to engage a pocket of the mount 46 to secure the spring clip to the mount 46.

The bracket 84 further includes an engagement surface 118, a front surface 119, and a first exterior profile 120. The engagement surface 118 may be configured to attach to one or more intermediate components of the second subassembly to secure the bracket 84 to the windshield 14. The first exterior profile 120 is configured in a rounded shape that includes at least one notches 122, in this example two notches 122. Each of the notches 122 may be configured to align with a corresponding portion of the one or more intermediate components to align or secure the bracket 84 to the one or more intermediate components.

A cylindrical opening 124 is disposed coaxially with the first exterior profile 120 and extends from the engagement surface 118 to a cone-shaped opening 114. The engagement wall 98 includes a profile having a first triangular assembly profile 126 and a second triangular assembly profile 128. The first triangular assembly profile 126 is configured to align with the internal engagement surfaces 94 of each of the plurality of legs 86, in this example the three legs 86 having a corresponding triangular shape. The second triangular assembly profile 128 is configured to rotatably engage the legs 86 by applying pressure from each of the lobes 100 in response to a rotational force applied to the spring clip 82. Upon rotation into the mounted position, each of the legs 86 may align with each of the lobes 100 to secure a first subassembly including the spring clip 82 to a second subassembly including the bracket 84.

The corresponding surfaces and rotating interaction of the bracket 84 and the spring clip 82 provide for an efficient locking assembly that minimizes the deflection of the spring clip 82 while being assembled to the bracket 84. This advantageous design provides for minimal plastic deformation allowing a clamping force of the spring clip 82 applied to the bracket 84 to be maximized for a given deflection of each of the legs 86 of the spring clip 82 in the mounted position. Limiting the plastic deformation of the spring clip 82 further allows for lower cost in manufacturing and higher variance in manufacturing the spring clip 82 and other similar spring biased clips introduced herein.

Figure 4:
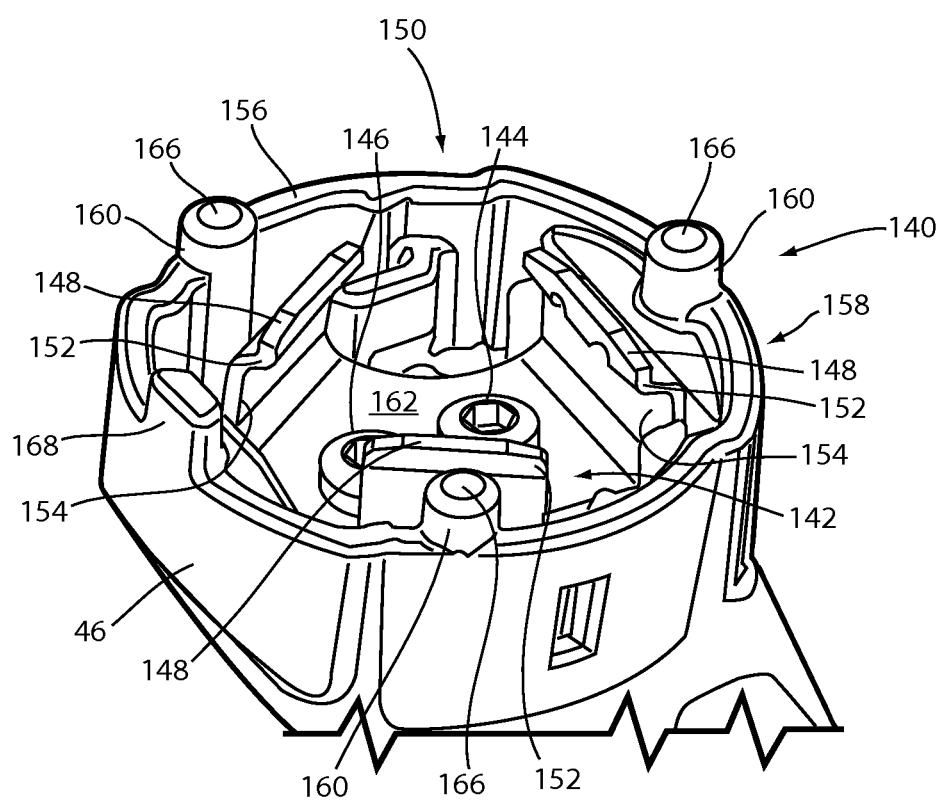
FIG. 4 is a cutout perspective view of a spring clip disposed in a mount of a first subassembly configured to support a rearview device of the present disclosure.

Referring now to FIG. 4, a cutout portion 140 of the first subassembly is shown including a spring clip 142 disposed in a mount 143. The mount 143 may be similar to the mount 46. In this illustrated embodiment, the spring clip 142 is shown received by the mount 143. A first fastener 144 and a second fastener 146 are disposed in a first mounting opening and a second mounting opening of the spring clip 142 and are further received by a first attachment cavity and a second attachment cavity of the mount 143. A plurality of legs 148 of the spring clip 142 extend outward from a pocket 150 formed by the mount 46. In this configuration, spring biased portions 152 of each of the plurality of legs 148 extends out of the pocket 150 such that an engagement profile 154 is positioned to engage an interface profile of a plurality of lobes of a bracket, for example the brackets 16, 84.

A perimeter wall 156 of the mount 143 forms an exterior surface 158. A plurality of posts 160 are formed parallel to the exterior surface 158 and extend outward from the mount 143. In the assembled configuration, the posts 160 also extend parallel to a direction normal to a surface 162 of a base portion of the spring clip 142. Each of the posts 160 includes a contact surface 166 configured to frictionally engage a front surface of a bracket, for example the front surfaces 64, 119. An assembly operation of the first subassembly begins by aligning the spring clip 142 with the front surface of the bracket such that the contact surfaces 166 of the posts 160 contact the front surface of the bracket. Once aligned, the first subassembly is rotated such that the interface profile of the plurality of lobes of the bracket may cause a deflection in each of the spring biased portions 152 of the legs 148.

The rotation of the first subassembly may continue until each of the lobes of the bracket is aligned with each of the plurality of legs 148. A locking detent 168 may further interact with a locking portion of the second subassembly, for example the one or more intermediate components coupled to the bracket. In this way, the spring clip 142 and the bracket may be locked in an assembled orientation to ensure that the assembly remains coupled to support a rearview device. The assembly operation described above limits the plastic deformation of the spring clip 142 and allows for lower cost in manufacturing the assembly. Limiting the plastic deformation may provide for lower cost materials to be used in manufacturing the spring clips 10, 82, 142; the brackets 16, 84; and various combinations and variations as discussed herein.

The present disclosure may be used with a mounting system such as that described in U.S. Pat. Nos. 8,201,800; 8,210,695; U.S. patent application Ser. No. 13/600,496, now U.S. Pat. No. 9,174,577; Ser. No. 13/527,375, now U.S. Pat. No. 9,838,653; Ser. No. 13/431,657, now U.S. Pat. No. 8,925,891; Ser. No. 13/402,701, now U.S. Pat. No. 8,814,737; Ser. No. 12/187,019, now U.S. Pat. No. 8,201,800, and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. No. 8,264,761; U.S. patent application Ser. Nos. 13/567,363, now U.S. Pat. No. 8,885,240; Ser. No. 13/405,697, now U.S. Pat. No. 8,646,924; Ser. No. 13/402,701, now U.S. Pat. No. 8,814,373; and Ser. No. 13/171,950, now U.S. Pat. No. 8,643,931, and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,201,800; 8,210,695; and U.S. patent application Ser. No. 13/271,745, now U.S. Pat. No. 8,827,517, which is hereby incorporated herein by reference in its entirety.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A rearview device mounting assembly configured for use with a vehicle, comprising:
    a spring clip comprising:
        a plurality of spring biased legs, each leg forming an engagement profile configured to couple to a subassembly comprising a rearview device, wherein the engagement profile forms a continuous rounded profile; and
    a bracket comprising:
        an engagement surface to couple to a windshield or indirectly through one or more intermediate components coupled to the windshield; and
        a plurality of lobes extending outward from an engagement wall, each of the plurality of lobes corresponding to each of the plurality of spring biased legs and forming an interface profile configured to complement the engagement profile; and
    wherein the spring clip is configured to engage the bracket in a first assembly profile and rotationally engage the bracket in a second assembly profile to operably couple the spring clip to the bracket and the engagement profile is configured to uniformly deflect along the continuous rounded profile due to the rotational engagement.

2. The assembly according to claim 1, wherein the spring clip further comprises a base portion and the continuous rounded profile includes a first curved portion extending outward from the base portion curving toward a direction normal to a surface of the base portion.

3. The assembly according to claim 2, wherein the continuous rounded profile further comprises a second curved portion extending back toward a center of the base portion proximate to a distal end of each of the legs.

4. The assembly according to claim 1, wherein each of the plurality of lobes comprises a plurality of rounded corners.

5. The assembly according to claim 1, further comprising:
    a rounded rib extending from the engagement wall to each of the plurality of lobes.

6. The assembly according to claim 1, wherein the continuous rounded profile comprises an arc comprising a continuous radius.

7. The assembly according to claim 1, wherein the continuous radius of the continuous rounded profile is configured to maximize a clamping force of each of the plurality of spring biased legs while limiting plastic deformation.

8. The spring clip according to claim 6, wherein the rounded arc comprises a continuous radius configured to prevent yield in each of the plurality of spring biased legs.

9. The spring clip according to claim 6, wherein the rounded arc is configured to deflect uniformly along the continuous rounded profile thereby limiting a plastic deformation of each of the plurality of spring biased legs.

10. A spring clip for a vehicle for mounting a rearview device, the spring clip comprising:
    a base portion comprising a coupling surface configured to interconnect the rearview device with the windshield;
    a plurality of spring biased legs, each leg forming an engagement profile having a continuous rounded profile and an internal engagement surface, the internal engagement surface forming a triangular assembly profile, wherein the engagement profile is configured to rotationally engage an interface profile of a bracket configured to interconnect the rearview device to a windshield; and
    wherein the engagement profile is configured to uniformly deflect along the continuous rounded profile, wherein the rotational engagement of the spring clip with the bracket minimizes a deflection by uniformly deflecting along the continuous rounded profile due to the rotational engagement.

11. The spring clip according to claim 10, wherein the continuous rounded profile comprises a first curved portion and a second curved portion.

12. The spring clip according to claim 11, wherein the first curved portion extends outward in a direction normal to the coupling surface.

13. The spring clip according to claim 12, wherein the second curved portion extends toward a central axis extending from a center of the base portion.

14. The spring clip according to claim 13, wherein a distal end of each of the plurality of legs is equidistant from the central axis.

15. The spring clip according to claim 10, further comprising:
    a beveled edge formed in at least one edge of each of the spring biased legs along the engagement profile.

16. The spring clip according to claim 10, wherein the engagement profile is configured to engage the continuous rounded profile to minimize a yield of each of the spring biased legs.

17. The spring clip according to claim 10, wherein the continuous rounded profile comprises a rounded arc.

18. A rearview device mounting assembly configured for use with a vehicle, comprising:
    a spring clip comprising:
        a plurality of spring biased legs, each leg forming an engagement profile configured to couple to a subassembly comprising a rearview device, wherein the engagement profile forms a continuous rounded profile; and
    a bracket comprising:
        an engagement surface to couple to a windshield or indirectly through one or more intermediate components coupled to the windshield;
        a plurality of lobes extending outward from an engagement wall, each of the plurality of lobes corresponding to each of the plurality of spring biased legs and forming an interface profile configured to complement the engagement profile; and
        the spring clip configured to engage the bracket in a first assembly profile and rotationally engage the bracket in a second assembly profile to operably couple the spring clip to the bracket; and wherein the engagement profile is configured to optimize the deflection of the spring clip in an elastic deformation in response to the spring clip rotationally engaging the bracket.

\* \* \* \* \*